(12) United States Patent
Fetzer et al.

(10) Patent No.: US 12,306,638 B2
(45) Date of Patent: May 20, 2025

(54) METHODS AND SCAN SYSTEMS FOR ANALYZING AN OBJECT

(71) Applicant: The Boeing Company, Chicago, IL (US)

(72) Inventors: Barry Fetzer, Renton, WA (US); Hong Hue Tat, Redmond, WA (US); Baljinder Singh, Renton, WA (US)

(73) Assignee: The Boeing Company, Arlington, VA (US)

( * ) Notice: Subject to any disclaimer, the term of this patent is extended or adjusted under 35 U.S.C. 154(b) by 564 days.

(21) Appl. No.: 17/526,831

(22) Filed: Nov. 15, 2021

(65) Prior Publication Data

US 2022/0155795 A1 May 19, 2022

Related U.S. Application Data

(60) Provisional application No. 63/115,399, filed on Nov. 18, 2020.

(51) Int. Cl.
*G05D 1/00* (2024.01)
*B25J 9/16* (2006.01)
(Continued)

(52) U.S. Cl.
CPC .......... *G05D 1/0274* (2013.01); *B25J 9/1697* (2013.01); *B64F 5/10* (2017.01);
(Continued)

(58) Field of Classification Search
CPC ..... G05D 1/0274; G05D 1/024; B25J 9/1697; B64F 5/10; B64F 5/60; G01B 11/002;
(Continued)

(56) References Cited

U.S. PATENT DOCUMENTS 4,670,653 A 6/1987 McConkle et al.
4,883,971 A 11/1989 Jensen
(Continued)

FOREIGN PATENT DOCUMENTS

| CN | 110648361 A | * | 1/2020 | ............ G06F 16/51 |
| EP | 2973074 B1 | | 4/2019 | |
| WO | WO 2018002871 | | 1/2018 | |

OTHER PUBLICATIONS

U.S. Appl. No. 16/874,489, filed May 14, 2020, Fetzer et al.
(Continued)

*Primary Examiner* — Rachid Bendidi
*Assistant Examiner* — Kirsten Jade M Santos
(74) *Attorney, Agent, or Firm* — Kolitch Romano Dascenzo Gates LLC

(57) ABSTRACT

Methods and scan systems for analyzing an object. The methods include obtaining a local operation dataset that includes a plurality of operation data points obtained from an object and a corresponding location, within the operation coordinate system, for each operation data point of the plurality of operation data points. The methods also include mapping the plurality of operation data points from the operation coordinate system to a global coordinate system for the object. The mapping includes mapping to generate a global operation dataset that includes the plurality of operation data points and a corresponding global location, within the global coordinate system, for each operation data point. The scan systems include a robot that performs a plurality of operations on an object within an operation coordinate system and a computing device that maps the plurality of operation data points from the operation coordinate system to a global coordinate system.

20 Claims, 5 Drawing Sheets

(51) Int. Cl.
  *B64F 5/10*     (2017.01)
  *G01B 11/00*    (2006.01)
  *G06F 16/29*    (2019.01)
  *G06T 7/73*     (2017.01)

(52) U.S. Cl.
  CPC .......... *G01B 11/002* (2013.01); *G05D 1/024* (2013.01); *G06F 16/29* (2019.01); *G06T 7/73* (2017.01)

(58) Field of Classification Search
  CPC .......... G01B 11/24; G06F 16/29; G06T 7/73; G06T 7/0004; G06T 2207/10028; G06T 2207/30164
  See application file for complete search history.

(56) References Cited

U.S. PATENT DOCUMENTS

| | | | |
|---|---|---|---|
| 6,593,156 B2 | 7/2003 | Nikawa | |
| 7,287,902 B2 | 10/2007 | Safai et al. | |
| 7,312,454 B2 | 12/2007 | Safai et al. | |
| 7,513,964 B2 | 4/2009 | Ritter et al. | |
| 7,520,666 B2 | 4/2009 | Pevzner et al. | |
| 7,553,070 B2 | 6/2009 | Kollgaard et al. | |
| 7,966,883 B2 | 6/2011 | Lorraine et al. | |
| 8,332,165 B1 | 12/2012 | Tat et al. | |
| 8,539,818 B2 | 9/2013 | Van Staden | |
| 8,965,100 B2 | 2/2015 | Lin et al. | |
| 9,164,066 B1 | 10/2015 | Bossi et al. | |
| 9,221,506 B1 | 12/2015 | Georgeson et al. | |
| 9,334,066 B2 | 5/2016 | Tapia et al. | |
| 9,358,331 B2 | 6/2016 | Fulkerson et al. | |
| 9,383,342 B1 | 7/2016 | Bossi et al. | |
| 9,404,898 B1 | 8/2016 | Georgeson et al. | |
| 9,414,026 B2 | 8/2016 | Blanchard et al. | |
| 9,433,720 B2 | 9/2016 | Updyke et al. | |
| 9,575,033 B1 | 2/2017 | Georgeson et al. | |
| 9,625,423 B2 | 4/2017 | Bossi et al. | |
| 9,645,012 B2 | 5/2017 | Marsh et al. | |
| 9,709,443 B2 | 7/2017 | Holmes et al. | |
| 9,746,445 B2 | 8/2017 | Hafenrichter et al. | |
| 9,796,089 B2 | 10/2017 | Lawrence, III et al. | |
| 9,861,733 B2 | 1/2018 | Burbank et al. | |
| 9,907,897 B2 | 3/2018 | Burbank et al. | |
| 10,035,103 B2 | 7/2018 | Fulkerson et al. | |
| 10,094,794 B2 | 10/2018 | Thompson et al. | |
| 10,126,273 B2 | 11/2018 | Pelivanov et al. | |
| 10,260,953 B2 | 4/2019 | Engelbart et al. | |
| 10,309,893 B2 | 6/2019 | Georgeson et al. | |
| 10,345,267 B2 | 7/2019 | O'Donnell et al. | |
| 10,514,363 B2 | 12/2019 | Ihn et al. | |
| 10,571,390 B2 | 2/2020 | Motzer et al. | |
| 10,677,715 B2 | 6/2020 | Tat et al. | |
| 10,690,581 B2 | 6/2020 | Thompson et al. | |
| 11,044,011 B2 | 6/2021 | Georgeson et al. | |
| 11,073,500 B2 | 7/2021 | Bingham et al. | |
| 11,131,650 B2 | 9/2021 | Abolmaesumi et al. | |
| 2004/0076216 A1 | 4/2004 | Chamberlain et al. | |
| 2008/0137105 A1 | 6/2008 | Howard et al. | |
| 2008/0247635 A1* | 10/2008 | Davis et al. | G06T 19/00 |
| 2010/0091112 A1* | 4/2010 | Veeser et al. | G01B 11/002 |
| 2012/0048021 A1 | 3/2012 | Ochiai et al. | |
| 2013/0061677 A1 | 3/2013 | Wang et al. | |
| 2016/0018324 A1 | 1/2016 | Georgeson | |
| 2016/0123933 A1 | 5/2016 | Fetzer et al. | |
| 2017/0297198 A1 | 10/2017 | Lawrence, III et al. | |
| 2018/0322623 A1* | 11/2018 | Memo et al. | G06N 3/045 |
| 2018/0361571 A1 | 12/2018 | Georgeson et al. | |
| 2019/0300205 A1 | 10/2019 | Georgeson et al. | |
| 2019/0371056 A1* | 12/2019 | Wetzel et al. | B64U 10/13 |
| 2020/0011840 A1 | 1/2020 | Hafenrichter et al. | |
| 2020/0015903 A1 | 1/2020 | Scheib et al. | |
| 2020/0225673 A1* | 7/2020 | Ebrahimi et al. | A47L 11/4011 |
| 2021/0090269 A1 | 3/2021 | Troy et al. | |
| 2021/0196385 A1 | 7/2021 | Shelton, IV et al. | |
| 2021/0237867 A1 | 8/2021 | Georgeson et al. | |

OTHER PUBLICATIONS

U.S. Appl. No. 63/126,305, filed Dec. 16, 2020, Motzer et al.

Liu et al., *Survey: State of the Art in NDE Data Fusion Techniques*, IEEE Transactions on Instrumentation And Measurement, vol. 56, No. 6, Dec. 2007.

Park et al., *Visualization of hidden delamination and debonding in composites through noncontact laser ultrasonic scanning*, Composites Science and Technology 100, pp. 10-18, 2014.

Gao et al., The Method of Aiming towards the Normal Direction for Robotic Drilling, International Journal of Precision Engineering And Manufacturing, vol. 18, No. 6, pp. 787-794, Jun. 2017.

* cited by examiner

METHODS AND SCAN SYSTEMS FOR ANALYZING AN OBJECT

RELATED APPLICATION

The present application is a non-provisional of and claims priority to U.S. Provisional Patent Application No. 63/115,399, filed on Nov. 18, 2020, entitled "METHODS AND SCAN SYSTEMS FOR ANALYZING AN OBJECT," the complete disclosure of which is incorporated by reference.

FIELD

The present disclosure relates generally to methods and scan systems for analyzing an object and more particularly to such methods and scan systems that map a plurality of operation data points from an operation coordinate system to a global coordinate system.

BACKGROUND

During manufacture of large objects, such as aircraft, a variety of different operations may be performed. For many large objects, it is common for such operations to be performed within an operation coordinate system that may not necessarily be referenced to any specific location on the object. Instead, the operation only may be made with reference to a starting location, or an origin, of the operation. As a specific example, a robot may be utilized to collect nondestructive testing data about the object, or aircraft. To this end, the robot may be raster scanned within a two-dimensional grid that represents points within the operation coordinate system. It may be desirable to locate specific positions within the operation coordinate system and/or to correlate specific data obtained during the nondestructive testing to downstream manufacturing operations and/or in-service performance. However, it may be difficult to do so after the scan is complete and/or after the robot has been removed from the two-dimensional scan grid. Thus, there exists a need for improved methods and scan systems for analyzing an object.

SUMMARY

Methods and scan systems for analyzing an object. The methods include obtaining a local operation dataset that includes a plurality of operation data points obtained from an object and a corresponding location, within the operation coordinate system, for each operation data point of the plurality of operation data points. The methods also include mapping the plurality of operation data points from the operation coordinate system to a global coordinate system for the object, which differs from the operation coordinate system. The mapping includes mapping to generate a global operation dataset that includes the plurality of operation data points and a corresponding global location, within the global coordinate system for the object, for each operation data point.

The scan systems include a robot that includes a sensor configured to perform a plurality of operations at a plurality of corresponding operation locations on an object. The plurality of operations is performed to generate a local operation dataset. The local operation dataset includes a plurality of operation data points and a corresponding location, within an operation coordinate system, for each operation data point of the plurality of operation data points. The scan system also includes a computing device. The computing device is programmed to map the plurality of operation data points from the operation coordinate system to a global coordinate system for the object, which differs from the operation coordinate system. The computing device further is programmed to generate a global operation dataset that includes the plurality of operation data points and a corresponding global location, within the global coordinate system for the object, for each operation data point.

DESCRIPTION

Figure 1:
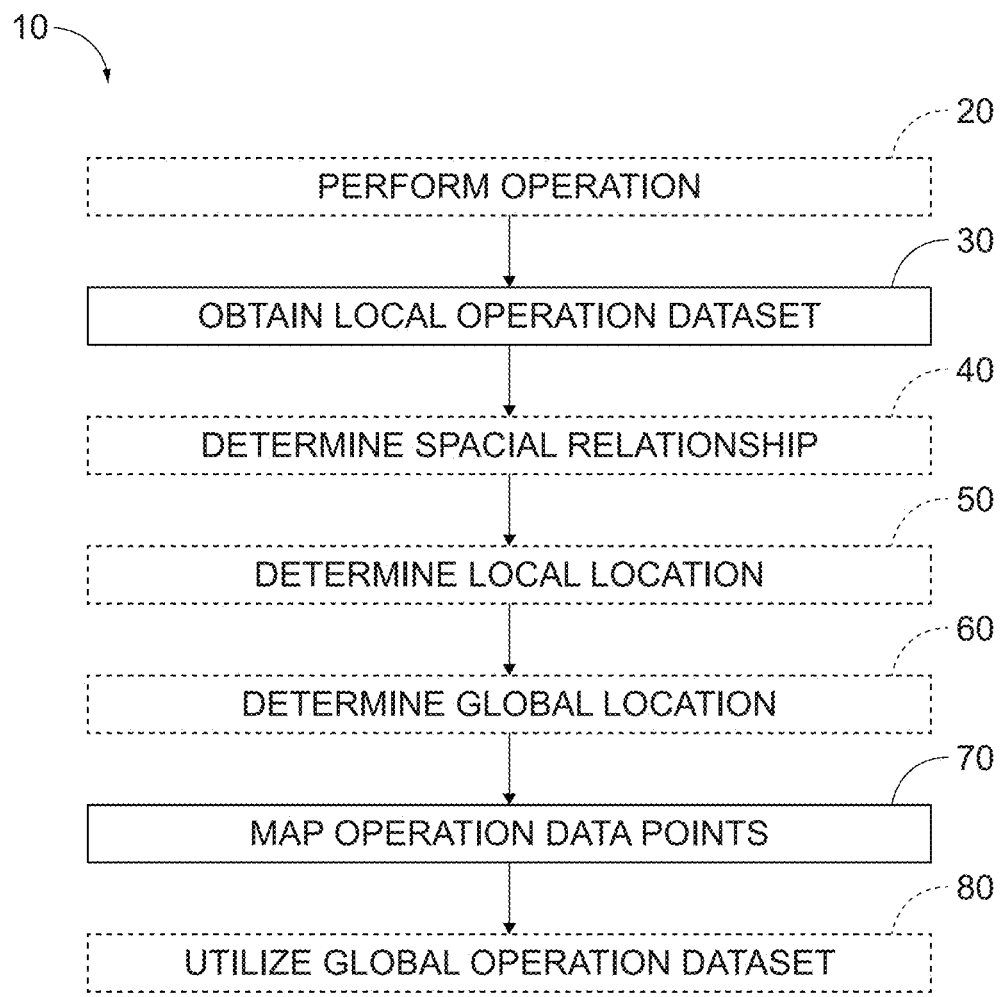
FIG. 1 is a flowchart depicting examples of methods of analyzing an object, according to the present disclosure.

FIGS. 1-5 provide illustrative, non-exclusive examples of methods 10, scan systems 150, operation coordinate systems 200, and/or global coordinate systems 300, according to the present disclosure. Elements that serve a similar, or at least substantially similar, purpose are labeled with like numbers in each of FIGS. 1-5, and these elements may not be discussed in detail herein with reference to each of FIGS. 1-5. Similarly, all elements may not be labeled in each of FIGS. 1-5, but reference numerals associated therewith may be utilized herein for consistency. Elements, components, and/or features that are discussed herein with reference to one or more of FIGS. 1-5 may be included in and/or utilized with any of FIGS. 1-5 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a flowchart depicting examples of methods 10 of analyzing an object, according to the present disclosure. Methods 10 may include performing an operation at 20 and include obtaining a local operation dataset at 30. Methods 10 also may include determining a spatial relationship at 40, determining a local location at 50, and/or determining a global location at 60. Methods 10 include mapping operation data points at 70 and may include utilizing a global operation dataset at 80. Methods 10 may be utilized to analyze any suitable object, examples of which include an aircraft, a sub-assembly of the aircraft, a marine craft, a sub-assembly of the marine craft, a spacecraft, and/or a sub-assembly of the spacecraft.

Obtaining the local operation dataset at 30 may include obtaining any suitable local operation dataset that includes a plurality of operation data points obtained from an object and a corresponding location, within an operation coordinate system, for each operation data point of the plurality of operation data points. The operation coordinate system may include and/or be any suitable coordinate system. In some examples, the operation coordinate system may be a 2-dimensional coordinate system and/or a coordinate system with 2, or with only 2, dimensions. In some such examples, the local operation dataset may be referred to herein as representing the plurality of operation data points within the 2-dimensional coordinate system and/or within a 2-dimensional plane.

Figure 2:
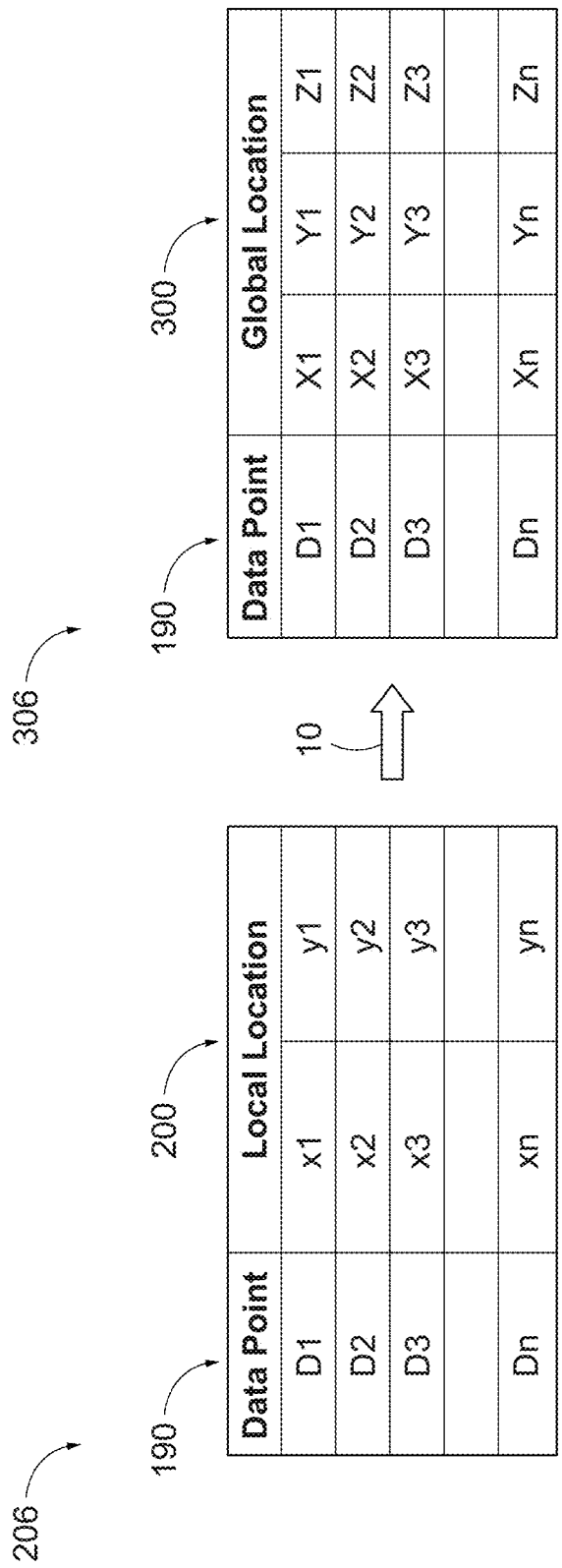
FIG. 2 is a schematic illustration of an example of a local operation dataset and a global operation dataset, according to the present disclosure.
Figure 3:
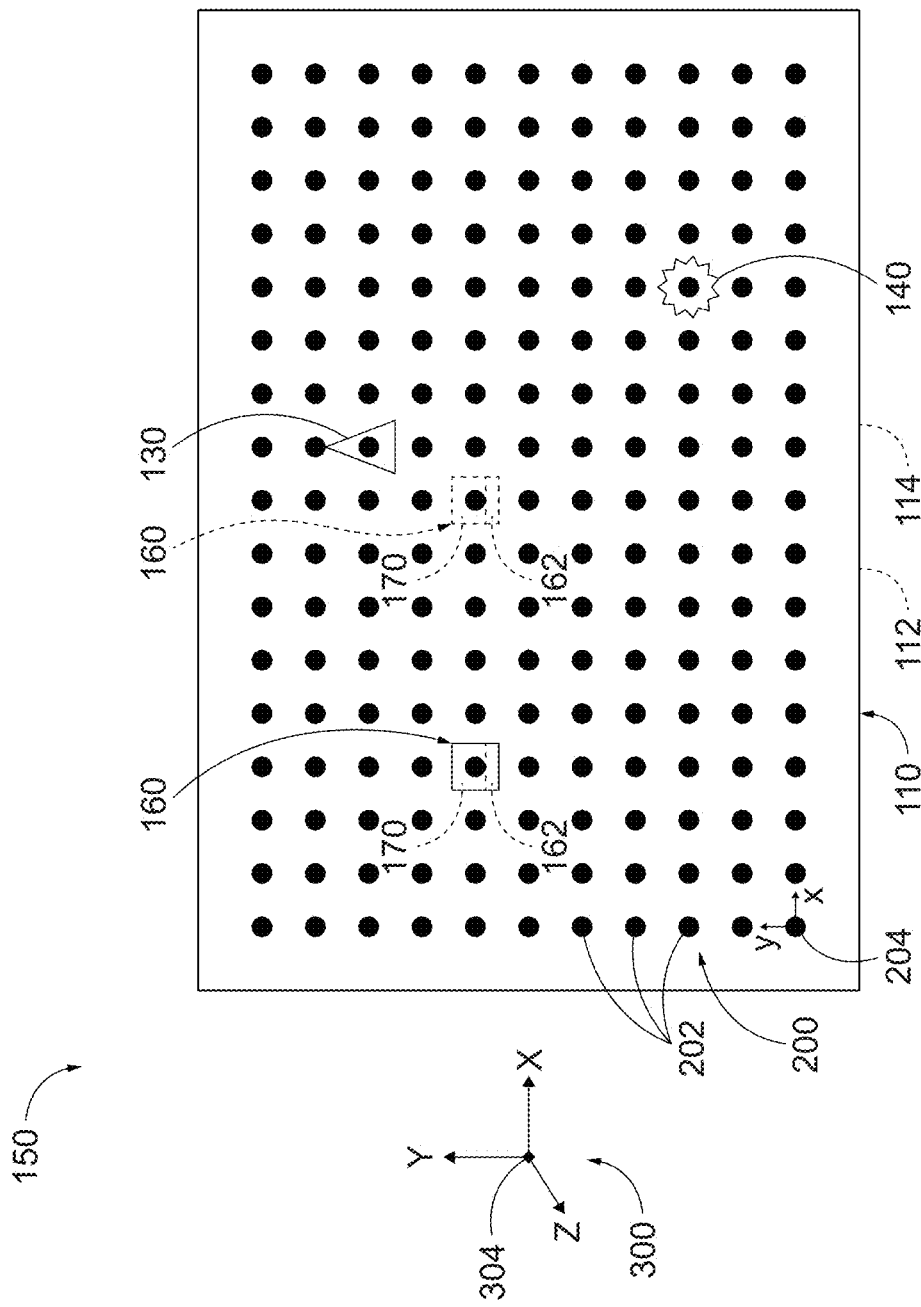
FIG. 3 is a schematic top view illustrating examples of a scan system according to the present disclosure.
Figure 4:
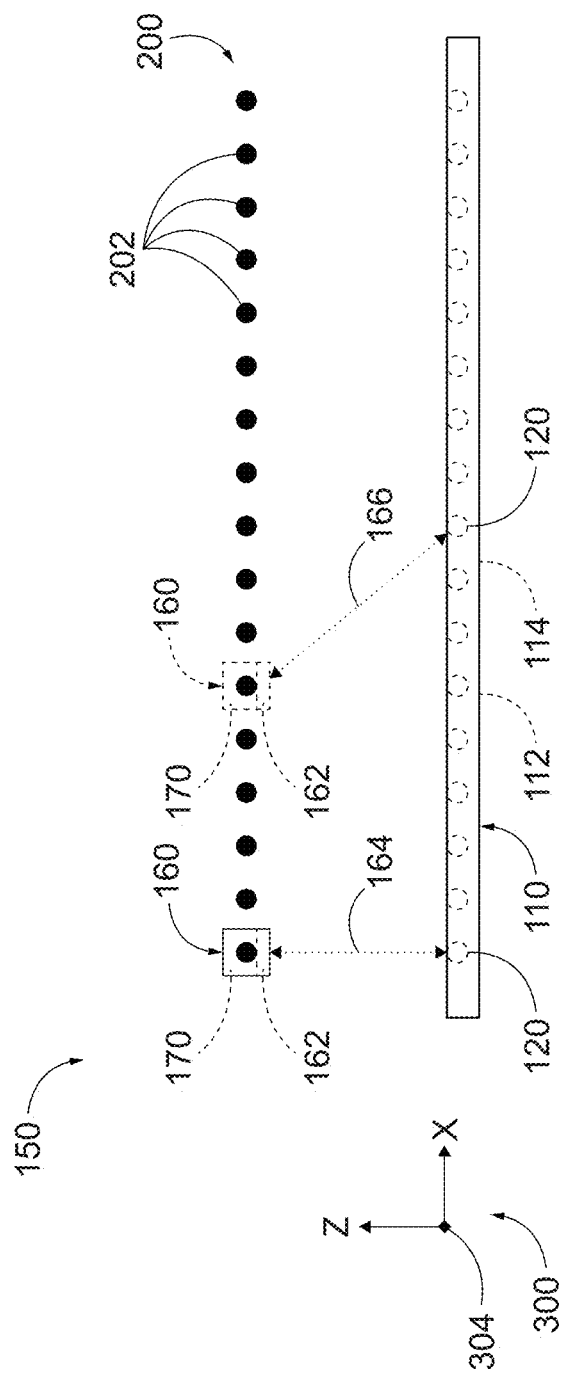
FIG. 4 is a schematic side view of the scan system of FIG. 3.
Figure 5:
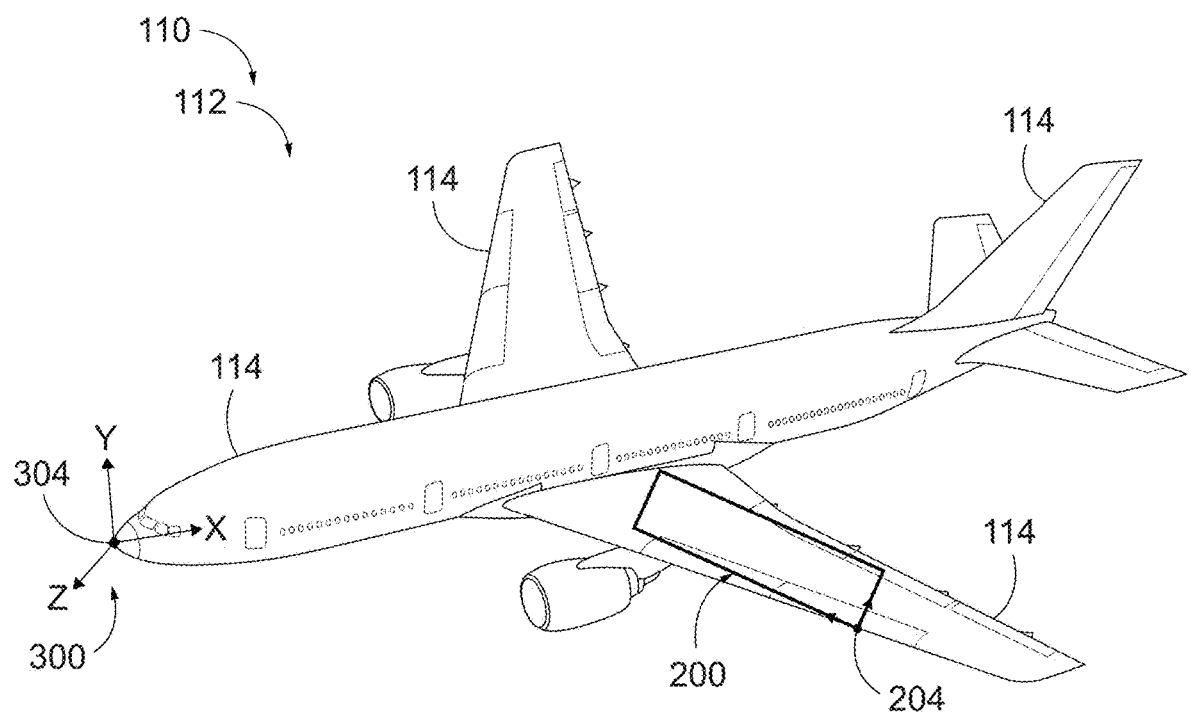
FIG. 5 is a schematic illustration of an object, in the form of an aircraft, and illustrates examples of an operation coordinate system and a global coordinate system, according to the present disclosure.

An example of the local operation dataset is illustrated in FIG. 2 and indicated at 206. As illustrated therein, local operation datasets 206, according to the present disclosure, may include a plurality of operation data points 190 and corresponding locations, for operation data points 190, within an operation coordinate system 200, which may be two-dimensional. Additional examples of operation coordinate system 200 are illustrated in FIGS. 3-5.

Mapping operation data points at 70 may include mapping the plurality of operation data points from the operation coordinate system to a global coordinate system for the object. The global coordinate system may differ from the operation coordinate system. The mapping at 70 may include mapping to produce and/or to generate the global operation dataset. The global operation dataset may include the plurality of operation data points and a corresponding global location, within the global coordinate system for the object, for each operation data point.

An example of the global operation dataset is illustrated in FIG. 2 and indicated at 306. As illustrated therein, global operation datasets 306, according to the present disclosure, may include the same operation data points 190 as local operation datasets 206 but may include corresponding locations, for operation data points 190, within a global coordinate system 300, which differs from the operation coordinate system and/or may be three-dimensional. Additional examples of global coordinate system 300 are illustrated in FIGS. 3-5.

In a specific example, the obtaining at 30 may include obtaining a first local operation dataset and also obtaining a second local operation dataset. The first local operation dataset may include a first plurality of operation data points in the form of a plurality of test results generated from nondestructive testing of the object. The first local operation dataset also may include a corresponding first-local-operation-dataset location, within the operation coordinate system, for each test result of the plurality of test results. The second local operation dataset may include a second plurality of operation data points in the form of a plurality of laser profiler dimensions of the object. The second local operation dataset also may include a corresponding second-local-operation-dataset location, within the operation coordinate system, for each laser profiler dimension of the plurality of laser profiler dimensions of the object.

As an example, and with reference to FIGS. 3-4, the plurality of test results may include a corresponding test result obtained from object 110 at each of a plurality of local locations 202 within operation coordinate system 200. Similarly, the plurality of laser profiler dimensions may include one or more dimensions of object 110 measured and/or obtained at local locations 202. In some examples, a corresponding test result and a corresponding laser profiler dimension may be associated with each local location 202. However, this is not required, and it is within the scope of the present disclosure that a first subset of local locations 202 may be associated only with a corresponding test result, that a second subset of local locations 202 may be associated only with a corresponding laser profiler dimension, and/or that a third subset of local locations 202 may be associated with neither a corresponding test result nor a corresponding laser profiler dimension.

In some examples, the obtaining at 30 may include obtaining the local operation dataset with, via, and/or utilizing a robot, such as robot 160 that is illustrated in FIGS. 3-4. In some such examples, the obtaining at 30 may include moving the robot to local locations 202, or to each local location 202, and collecting a corresponding test result and/or a corresponding laser profiler dimension at the local locations. In some such examples, the corresponding location for each operation data point may include and/or be a location of the robot within the operation coordinate system and/or within a 2-dimensional grid that defines the operation coordinate system.

In some such examples, methods 10, or the mapping at 70, may include determining a local spatial relationship, as indicated in FIG. 1 at 40. The determining at 40 may include determining the local spatial relationship between the location of the robot within the 2-dimensional grid and a location, on the object, at which each operation data point is obtained by the robot. In some such examples, the mapping at 70 may include mapping the plurality of operation data points from the operation coordinate system to the global coordinate system based, at least in part, on the operation coordinate system, the global coordinate system, and the local spatial relationship.

In some examples, and as illustrated by the example of robot 160 that is illustrated in solid lines in FIG. 4, the local spatial relationship may include a distance 164 between robot 160 and a location 120, on object 110, at which each operation data point is obtained by the robot, with distance 164 being measured in a direction that is perpendicular to a plane that is defined by operation coordinate system 200. In some such examples, and as illustrated collectively by FIGS. 3-4, determining the local spatial relationship may include determining X and Y locations on the object that correspond to X and Y locations within operation coordinate system 200, also determining a Z location on the object that may correspond to distance 164 between robot 160 and object 110.

In some examples, and as illustrated by the example of robot 160 that is illustrated in dashed lines in FIG. 4, the local spatial relationship may include a distance 166 between robot 160 and location 120, with distance 166 being measured in a direction that is not perpendicular to the plane that is defined by operation coordinate system 200. In some such examples, determining the local spatial relationship bay include determining X, Y, and/or Z locations, on the object, that differ from an X, Y, and/or Z position of robot 160 and/or determining a mathematical and/or a geometric transformation that may be utilized to determine the location on the object based upon the location of the robot.

In some examples, methods 10 also may include determining the local location at 50. The determining at 50 may include determining an operation location of a reference feature of the object within the operation coordinate system. An example of the reference feature of the object is illustrated in FIG. 3 and indicated at 130. In a specific example, the determining at 50 may include determining the operation location of the reference feature with, via, and/or as identified in the plurality of laser profiler dimensions. In some such examples, methods 10 further may include determining the global location at 60. The determining at 60 may include determining the global location of the reference feature of the object within the global coordinate system for the object. When methods 10 include the determining at 50 and the determining at 60, the mapping at 70 may be based, at least in part, on the operation of the reference feature and on the global location of the reference feature. Examples of the reference feature include a unique structure, a geometrically unique structure, a distinctive structure, a geometrically distinctive structure, a structure with a global location that is specifically defined within the global coordinate system of the object, a hole, a fastener, a rib, a spar, and/or an intersection region between two or more structures of the object.

Stated another way, and when the obtaining at 30 includes obtaining the plurality of laser profiler dimensions, the determining at 50 and the determining at 60 may be utilized to correlate, to compare, and/or to generate a mathematical relationship between the local location of the reference structure and the global location of the reference structure. This correlation, comparison, and/or mathematical relationship then may be utilized to specify and/or to determine a quantitative relationship between the operation coordinate system and the global coordinate system; and this quantitative relationship may be utilized to permit and/or to facilitate the mapping at 70.

Performing the operation at 20, when utilized, may include performing the operation on the object, such as to generate the local operation dataset. In some examples, the performing at 20 may include performing with, via, and/or utilizing the robot. This may include moving the robot relative to the object and/or within the operation coordinate system. As an example, the performing at 20 may include moving robot 160 from the position that is illustrated in solid lines in FIGS. 3-4 to the position that is illustrated in dashed lines in FIGS. 3-4.

When methods 10 include the performing at 20, the performing at 20 may include performing the operation with, or with at least a threshold spatial resolution. As an example, and with continued reference to FIGS. 3-4, the performing at 20 may include performing the operation such that local locations 202 and/or locations 120 on object 110 (as illustrated in FIG. 4) are separated by the threshold spatial resolution. Examples of the threshold spatial resolution include spatial resolutions of at least 0.01 millimeter (mm), at least 0.05 mm, at least 0.1 mm, at least 0.25 mm, at least 0.5 mm, at least 1.0 mm, at least 2.0 mm, at least 3.0 mm, at least 4.0 mm, or at least 5.0 mm. Additional examples of the threshold spatial resolution include spatial resolutions of at most 20 mm, at most 15 mm, at most 10 mm, at most 8 mm, at most 6 mm, at most 4 mm, at most 3 mm, at most 2 mm, or at most 1 mm.

It is within the scope of the present disclosure that the obtaining at 30 may be performed in any suitable manner. As an example, the obtaining at 30 may include obtaining the local operation dataset from a database that includes the local operation dataset. As another example, such as when methods 10 include the performing at 20, the obtaining at 30 may include obtaining the local operation dataset responsive to and/or as a result of the performing at 20.

The operation may include and/or be any suitable operation that may be performed on the object. Examples of the operation include a non-destructive inspection and/or test of the object, examples of which include a non-contact inspection of the object, ultrasound inspection of the object, an infrared inspection of the object, an optical inspection of the object, a dimensional inspection of the object, and/or a laser dimensional inspection of the object.

Determining the spatial relationship at 40, when performed, may include determining a spatial relationship between the operation coordinate system and the global coordinate system for the object and may be accomplished in any suitable manner. As an example, the determining at 40 may include determining and/or establishing at least one reference location within both the operation coordinate system and the global coordinate system, such as by performing the determining at 50 and the determining at 60. The determining at 40 then may include determining the spatial relationship based, at least in part, on an operation coordinate system position of the at least one reference location within the operation coordinate system, a global coordinate system position of the at least one reference location within the global coordinate system for the object, and/or a comparison between the operation coordinate system position and the global coordinate system position.

Mapping operation data points at 70 may include mapping the plurality of operation data points from the operation coordinate system to the global coordinate system for the object. The mapping at 70 may be performed utilizing a spatial relationship between the operation coordinate system and the global coordinate system to map the plurality of operation data points from the operation coordinate system to the global coordinate system. In some examples, the spatial relationship may be predetermined and/or pre-established. In some examples, the spatial relationship may be determined during methods 10, such as via the determining at 40.

In a specific example, and as illustrated collectively by FIGS. 3-5, operation coordinate system 200 may include a local origin 204, such as a starting position for performing the operation and/or a first location at which operation data points are collected. Similarly, global coordinate system 300 may include a global origin 304, such as may be associated with a reference structure of object 110. In some such examples, the mapping at 70 may include determining a position of local origin 204 within global coordinate system 300 and utilizing the position of the local origin within the global coordinate system to map the plurality of operation data points from the operation coordinate system to the global coordinate system. This may include calculating corresponding X, Y, and Z locations for each operation data point, within global coordinate system 300, based upon corresponding x, y, and z locations for each operation data point within operation coordinate system 200 and also on the position of local origin 204 within global coordinate system 300.

Utilizing the global operation dataset at 80 may include utilizing the global operation dataset in any suitable manner. As an example, the utilizing at 80 may include utilizing the global operation dataset during construction of the object. As a more specific example, the utilizing at 80 may include utilizing the global operation dataset to determine a rework location where rework is to be performed on the object. In some such examples, methods 10 further may include performing the rework on the object. As another more specific example, the utilizing at 80 may include utilizing the global operation dataset to determine a repair location where a repair is to be performed on the object. In some such examples, methods 10 further may include performing the repair on the object. As yet another more specific example, the utilizing at 80 may include utilizing the global operation dataset to determine a deviation in at least one geometric property of the object from an expected geometric property. In some such examples, methods 10 further may include utilizing a shim to adjust for the deviation in the at least one geometric property of the object.

As another more specific example, the utilizing at 80 may include utilizing the global operation dataset to determine a location of a defect within the object. In some such examples, methods 10 further may include visually observing the defect, comparing the defect to a predetermined defect tolerance, scrapping the object when the defect is outside the predetermined defect tolerance, reworking the object when the defect is outside the predetermined defect tolerance, and/or approving the object for utilization when the defect is within the predetermined defect tolerance. An example of a defect that may be identified within the operation dataset is illustrated in FIG. 3 and indicated at 140.

In some examples, the predetermined defect tolerance may include and/or be a global defect tolerance, such as may be utilized and/or established for an entirety of the object. Additionally or alternatively, and in some examples, the predetermined defect tolerance may include and/or be a location-specific defect tolerance, such as may be utilized and/or established for a given location on and/or region of the object. Because methods 10 include the mapping at 70, methods 10 may permit and/or facilitate establishing and/or utilizing location-specific defect tolerances that may vary with location on and/or with region of, or on, the object. This may be in contrast to prior art methods of analyzing an object, which do not include the mapping at 70 and thus cannot meaningfully utilize and/or establish location-specific defect tolerances.

As yet another more specific example, the utilizing at 80 may include utilizing the global operation dataset to estimate tool wear of a tool utilized to construct the object. In some such examples, methods 10 further may include dispositioning the tool based, at least in part, on the tool wear.

As another example, the utilizing at 80 may include utilizing the global operation dataset during in-service repair of the object. As a more specific example, the utilizing at 80 may include utilizing the global operation dataset to correlate a location of the operation data points with a location of a repair. As another more specific example, the utilizing at 80 may include utilizing the global operation dataset to predict the location of the repair based, at least in part, on the location of the operation data points.

As discussed, methods 10 include obtaining the local operation dataset, which includes a plurality of operation data points in an operation coordinate system, and mapping the plurality of operation data points to a global coordinate system to generate a global operation dataset. The operation coordinate system may include and/or be any suitable coordinate system. In some examples, and as discussed, the operation coordinate system may include and/or be a 2-dimensional coordinate system. In some examples, the local operation dataset represents the plurality of operation data points within the 2-dimensional coordinate system and/or within a 2-dimensional plane. Similarly, the global coordinate system may include and/or be any suitable coordinate system. In some examples, and as discussed, the global coordinate system may include and/or be a 3-dimensional coordinate system. In some examples, the global coordinate system may represent the plurality of operation data points within a 3-dimensional space.

The object may include and/or be any suitable object. In some examples, and as illustrated in FIGS. 3-5, the object may include and/or be an aircraft 112 and/or a sub-assembly 114 of the aircraft. In some examples, the object may include at least a region of the aircraft. In some such examples, the global coordinate system for the object may describe a location of the plurality of operation data points relative to a reference structure of the aircraft. Stated another way, a global origin 304 of global coordinate system 300 may be positioned at and/or on the reference structure of the aircraft. In a specific example, and as illustrated in FIG. 5, the reference structure of the aircraft may include and/or be a nose, or a forward most region, of the aircraft.

Methods 10 may be performed with, via, and/or utilizing a scan system 150. FIG. 3 is a schematic top view illustrating examples of a scan system 150 according to the present disclosure, while FIG. 4 is a schematic side view of the scan system of FIG. 3. As illustrated in FIGS. 3-4, scan system 150 includes a robot 160 that includes a sensor 162. Robot 160 and/or sensor 162 may be configured to perform a plurality of operations at a plurality of corresponding operation locations of an object 110, and the corresponding operation locations may correspond to, or may be performed from, local locations 202 within an operation coordinate system 200. In performing the plurality of operations, the robot may generate a local operation dataset that includes a plurality of operation data points and a corresponding location, within operation coordinate system 200, for each operation data point. An example of the local operation dataset is illustrated in FIG. 2 and indicated at 206. Examples of the plurality of operations are disclosed herein.

As also illustrated in FIGS. 3-4, scan system 150 includes a computing device 170. Computing device 170 is programmed to map the plurality of operation locations from operation coordinate system 200 to a global coordinate system 300 for object 110. Global coordinate system 300 may differ from operation coordinate system 200, and computing device 170 may generate a global operation dataset that includes the plurality of operation data points and a corresponding global location, within global coordinate system 300, for each operation data point. An example of the global operation dataset is illustrated in FIG. 2 and indicated at 306. Scan system 150 additionally or alternatively may be programmed to perform any suitable step and/or steps of methods 10, which are disclosed herein.

Computing device 170 may include and/or be any suitable structure, device, and/or devices that may be adapted, configured, designed, constructed, and/or programmed to perform the functions discussed herein. As examples, computing device 170 may include one or more of an electronic controller, a dedicated controller, a special-purpose controller, a personal computer, a special-purpose computer, a display device, a logic device, a memory device, and/or a memory device having computer-readable storage media.

The computer-readable storage media, when present, also may be referred to herein as non-transitory computer readable storage media. This non-transitory computer readable storage media may include, define, house, and/or store computer-executable instructions, programs, and/or code; and these computer-executable instructions may direct scan system 150 and/or computing device 170 thereof to perform any suitable portion, or subset, of methods 10.

Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

Illustrative, non-exclusive examples of inventive subject matter according to the present disclosure are described in the following enumerated paragraphs:

A1. A method (10) of analyzing an object (110), the method (10) comprising:

obtaining (30) a local operation dataset (206) that includes a plurality of operation data points (190) obtained from the object (110) and a corresponding local location (202), within an operation coordinate system (200), for each operation data point (190) of the plurality of operation data points (190); and mapping (70) the plurality of operation data points (190) from the operation coordinate system (200) to a global coordinate system (300) for the object (110), which differs from the operation coordinate system (200), to generate a global operation dataset (306) that includes the plurality of operation data points (190) and a corresponding global location, within the global coordinate system (300) for the object (110), for each operation data point (190).

A2. The method (10) of paragraph A1, wherein the obtaining (30) the local operation dataset (206) includes:
(i) obtaining a first local operation dataset that includes a first plurality of operation data points, in the form of a plurality of test results generated from nondestructive testing of the object (110), and a corresponding first-local-operation-dataset location, within the operation coordinate system (200), for each test result of the plurality of test results; and
(ii) optionally obtaining a second local operation dataset that includes a second plurality of operation data points, in the form of a plurality of laser profiler dimensions of the object (110), and a corresponding second-location-operation-dataset location, within the operation coordinate system (200), for each laser profiler dimension of the plurality of laser profiler dimensions of the object (110).

A3. The method (10) of paragraph A2, wherein the local operation dataset (206) is obtained via a robot (160), wherein the corresponding location for each operation data point (190) includes a location of the robot (160) within a 2-dimensional grid that defines the operation coordinate system (200), and further wherein the mapping (70) the plurality of operation data points (190) includes determining (40) a local spatial relationship between the location of the robot (160) within the 2-dimensional grid and a location (120), on the object (110), at which each operation data point (190) is obtained by the robot (160).

A4. The method (10) of paragraph A2, wherein the mapping (70) the plurality of operation data points (190) from the operation coordinate system (200) to the global coordinate system (300) for the object (110) includes mapping based, at least in part, on the operation coordinate system (200), the global coordinate system (300) for the object (110), and the local spatial relationship.

A5. The method (10) of any of paragraphs A2-A4, wherein the method (10) further includes determining (50) a local location of a reference feature (130) of the object (110) within the operation coordinate system (200), optionally as identified in the plurality of laser profiler dimensions, and also determining (60) a global location of the reference feature (130) of the object (110) within the global coordinate system (300) for the object (110), wherein the mapping (70) the plurality of operation data points (190) from the operation coordinate system (200) to the global coordinate system (300) for the object (110) includes mapping (70) based, at least in part, on the operation location of the reference feature (130) and the global location of the reference feature (130).

A6. The method (10) of any of paragraphs A1-A5, wherein the obtaining (30) the local operation dataset (206) includes obtaining the local operation dataset (206) from a database that includes the local operation dataset (206).

A7. The method (10) of any of paragraphs A1-A6, wherein the local operation dataset (206) is generated by performing (20) an operation on the object (110) to generate the local operation dataset (206).

A8. The method (10) of paragraph A7, wherein the method (10) further includes performing the operation on the object (110) with a robot (160) to generate the local operation dataset (206).

A9. The method (10) of paragraph A8, wherein the performing (20) the operation includes moving the robot (160) relative to the object (110) and within the operation coordinate system (200).

A10. The method (10) of any of paragraphs A7-A8, wherein the performing (20) the operation includes performing the operation with a spatial resolution of at least one of:
(i) at least 0.01 millimeter (mm), at least 0.05 mm, at least 0.1 mm, at least 0.25 mm, at least 0.5 mm, at least 1.0 mm, at least 2.0 mm, at least 3.0 mm, at least 4.0 mm, or at least 5.0 mm; and at most 20 mm, at most 15 mm, at most 10 mm, at most 8 mm, at most 6 mm, at most 4 mm, at most 3 mm, at most 2 mm, or at most 1 mm.

A11. The method (10) of any of paragraphs A7-A10, wherein the operation includes at least one of:
(i) a non-destructive inspection of the object (110);
(ii) a non-contact inspection of the object (110);
(iii) an ultrasound inspection of the object (110);
(iv) an infrared inspection of the object (110);
(v) an optical inspection of the object (110);
(vi) a dimensional inspection of the object (110); and
(vii) a laser dimensional inspection of the object (110).

A12. The method (10) of any of paragraphs A1-A11, wherein the mapping (70) the plurality of operation data points (190) from the operation coordinate system (200) to the global coordinate system (300) for the object (110) includes utilizing a spatial relationship between the operation coordinate system (200) and the global coordinate system (300) for the object (110) to map the plurality of operation data points (190) from the operation coordinate system (200) to the global coordinate system (300) for the object (110).

A13. The method (10) of paragraph A12, wherein the method (10) further includes determining the spatial relationship between the operation coordinate system (200) and the global coordinate system (300) for the object (110).

A14. The method (10) of paragraph A13, wherein the determining the spatial relationship includes establishing at least one reference location within both the operation coordinate system (200) and the global coordinate system (300) for the object (110), and further wherein the determining the spatial relationship includes determining based, at least in part, on at least one of:
(i) an operation coordinate system (200) position of the at least one reference location within the operation coordinate system (200);

(ii) a global coordinate system (300) position of the at least one reference location within the global coordinate system (300) for the object (110); and (iii) a comparison between the operation coordinate system (200) position and the global coordinate system (300) position.

A15. The method (10) of any of paragraphs A1-A14, wherein the method (10) further includes utilizing (80) the global operation dataset (306).

A16. The method (10) of paragraph A15, wherein the utilizing (80) the global operation dataset (306) includes utilizing the global operation dataset (306) during construction of the object (110).

A17. The method (10) of paragraph A16, wherein the utilizing (80) the global operation dataset (306) during construction of the object (110) includes utilizing the global operation dataset (306) at least one of:

(i) determine a rework location where rework is to be performed on the object (110), optionally wherein the methods (10) further include performing the rework on the object (110);

(ii) determine a repair location where a repair is to be performed on the object (110), optionally wherein the methods (10) further include performing the repair;

(iii) determine a deviation in at least one geometric property of the object (110) from an expected geometric property, and optionally wherein the method (10) includes utilizing a shim to adjust for the deviation in the at least one geometric property of the object (110);

(iv) determine a location of a defect (140) within the object (110), optionally wherein the method (10) includes visually observing the defect (140), optionally wherein the method (10) includes comparing the defect (140) to a predetermined defect tolerance, and further optionally wherein the method (10) includes at least one of scrapping the object (110) when the defect (140) is outside the predetermined defect tolerance, reworking the object (110) when the defect (140) is outside the predetermined defect tolerance, and approving the object (110) for utilization when the defect (140) is within the predetermined defect tolerance; and (v) estimate tool wear of a tool utilized to construct the object (110), optionally wherein the method (10) further includes dispositioning the tool based, at least in part, on the tool wear.

A18. The method (10) of any of paragraphs A15-A17, wherein the utilizing (80) the global operation dataset (306) includes utilizing the global operation dataset (306) during in-service repair of the object (110).

A19. The method (10) of paragraph A18, wherein the utilizing (80) the global operation dataset (306) during in-service repair of the object (110) includes utilizing the global operation dataset (306) to at least one of:

(i) correlate a location of the operation data points (190) with a location of a repair; and (ii) predict the location of the repair based, at least in part, on the location of the operation data points (190).

A20. The method (10) of any of paragraphs A1-A19, wherein the object (110) includes at least one of:

(i) an aircraft (112);
(ii) a sub-assembly (114) of the aircraft (112);
(iii) a marine craft;
(iv) a sub-assembly of the marine craft;
(v) a spacecraft; and
(vi) a sub-assembly of the spacecraft.

A21. The method (10) of any of paragraphs A1-A20, wherein at least one of:

(i) the operation coordinate system (200) is a 2-dimensional coordinate system; and (ii) the local operation dataset (206) represents the plurality of operation data points (190) within a 2-dimensional plane.

A22. The method (10) of any of paragraphs A1-A21, wherein at least one of:

(i) the global coordinate system (300) for the object (110) is a 3-dimensional coordinate system; and (ii) the global coordinate system (300) for the object (110) represents the plurality of operation data points (190) within a 3-dimensional space.

A23. The method (10) of any of paragraphs A1-A22, wherein the object (110) includes at least a region of an aircraft (112), and further wherein the global coordinate system (300) for the object (110) describes a location of the plurality of operation data points (190) relative to a reference structure of the aircraft (112).

B1. A scan system (150) for analyzing an object (110), the scan system (150) comprising:

a robot (160) including a sensor (162) configured to perform a plurality of operations at a plurality of corresponding operation locations on an object (110) to generate a local operation dataset (206) that includes a plurality of operation data points (190) and a corresponding location, within an operation coordinate system (200), for each operation data point (190) of the plurality of operation data points (190); and a computing device (170) programmed to map the plurality of operation data points (190) from the operation coordinate system (200) to a global coordinate system (300) for the object (110), which differs from the operation coordinate system (200), to generate a global operation dataset (306) that includes the plurality of operation data points (190) and a corresponding global location, within the global coordinate system (300) for the object (110), for each operation data point (190).

B2. The scan system (150) of paragraph B1, wherein the computing device (170) further is programmed to perform any suitable step of any of the methods (10) of any of paragraphs A1-A23.

C1. Non-transitory computer readable storage media including computer-executable instructions that, when executed, direct a computing device (170) to perform the method (10) of any of paragraphs A1-A23.

D1. The use of a scan system (150) to map a plurality of operation data points (190) from an operation coordinate system (200), in which the plurality of operation data points (190) is obtained, to a global coordinate system (300) for an object (110), which differs from the operation coordinate system (200), to generate a global operation dataset (306).

D2. The use of any of the methods (10) of any of paragraphs A1-A23 with any of the scan systems (150) of any of paragraphs B1-B2.

D3. The use of any of the scan systems (150) of any of paragraphs B1-B2 with any of the methods (10) of any of paragraphs A1-A23.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A method of analyzing an object that includes at least a region of an aircraft, the method comprising:
   obtaining a local operation dataset that includes a plurality of operation data points obtained from the object and a corresponding local location, within an operation coordinate system, for each operation data point of the plurality of operation data points, wherein the obtaining the local operation dataset includes performing an operation on the object with a robot to generate the local operation dataset, and further wherein the performing the operation includes:
   (i) moving the robot relative to the object and to a plurality of distinct local locations within the operation coordinate system; and
   (ii) collecting a corresponding test result at each distinct local location; and
   mapping the plurality of operation data points from the operation coordinate system to a global coordinate system for the object, which differs from the operation coordinate system, to generate a global operation dataset that includes the plurality of operation data points and a corresponding global location, within the global coordinate system for the object, for each operation data point;
   wherein the method further includes utilizing the global operation dataset to determine a location of a defect within the object;
   wherein the method includes comparing the defect to a predetermined defect tolerance, wherein the predetermined defect tolerance is a location-specific predetermined defect tolerance that varies with location within the operation coordinate system; and
   further wherein the method includes at least one of:
   (i) scrapping the object when the defect is outside the predetermined defect tolerance;
   (ii) reworking the object when the defect is outside the predetermined defect tolerance; and
   (iii) approving the object for utilization when the defect is within the predetermined defect tolerance.

2. The method of claim 1, wherein the obtaining the local operation dataset includes:

(i) obtaining a first local operation dataset that includes a first plurality of operation data points, in the form of a plurality of test results generated from nondestructive testing of the object, and a corresponding first-local-operation-dataset location, within the operation coordinate system, for each test result of the plurality of test results; and (ii) obtaining a second local operation dataset that includes a second plurality of operation data points, in the form of a plurality of laser profiler dimensions of the object, and a corresponding second-location-operation-dataset location, within the operation coordinate system, for each laser profiler dimension of the plurality of laser profiler dimensions of the object.

3. The method of claim 2, wherein the corresponding local location for each operation data point includes a location of the robot within a 2-dimensional grid that defines the operation coordinate system, and further wherein the mapping the plurality of operation data points includes determining a local spatial relationship between the location of the robot within the 2-dimensional grid and a location, on the object, at which each operation data point is obtained by the robot.

4. The method of claim 3, wherein the mapping the plurality of operation data points from the operation coordinate system to the global coordinate system for the object includes mapping based, at least in part, on the operation coordinate system, the global coordinate system for the object, and the local spatial relationship.

5. The method of claim 2, wherein the method further includes determining a local location of a reference feature of the object within the operation coordinate system, as identified in the plurality of laser profiler dimensions, and also determining a global location of the reference feature of the object within the global coordinate system for the object, wherein the mapping the plurality of operation data points from the operation coordinate system to the global coordinate system for the object includes mapping based, at least in part, on the local location of the reference feature and the global location of the reference feature.

6. The method of claim 1, wherein the obtaining the local operation dataset includes obtaining the local operation dataset from a database that includes the local operation dataset.

7. The method of claim 1, wherein the performing the operation includes performing the operation with a spatial resolution of at least 0.01 millimeter and at most 20 mm.

8. The method of claim 1, wherein the operation includes at least one of:
(i) a non-destructive inspection of the object;
(ii) a non-contact inspection of the object;
(iii) an ultrasound inspection of the object;
(iv) an infrared inspection of the object;
(v) an optical inspection of the object;
(vi) a dimensional inspection of the object; and
(vii) a laser dimensional inspection of the object.

9. The method of claim 1, wherein the mapping the plurality of operation data points from the operation coordinate system to the global coordinate system for the object includes utilizing a spatial relationship between the operation coordinate system and the global coordinate system for the object to map the plurality of operation data points from the operation coordinate system to the global coordinate system for the object.

10. The method of claim 9, wherein the method further includes determining the spatial relationship between the operation coordinate system and the global coordinate system for the object.

11. The method of claim 10, wherein the determining the spatial relationship includes establishing at least one reference location within both the operation coordinate system and the global coordinate system for the object, and further wherein the determining the spatial relationship includes determining based, at least in part, on at least one of:
(i) an operation coordinate system position of the at least one reference location within the operation coordinate system;
(ii) a global coordinate system position of the at least one reference location within the global coordinate system for the object; and
(iii) a comparison between the operation coordinate system position and the global coordinate system position.

12. The method of claim 1, wherein the method further includes utilizing the global operation dataset during construction of the object to at least one of:
(i) determine a rework location where rework is to be performed on the object, wherein the method further includes performing the rework on the object;
(ii) determine a repair location where a repair is to be performed on the object, wherein the method further include performing the repair;
(iii) determine a deviation in at least one geometric property of the object from an expected geometric property, wherein the method includes utilizing a shim to adjust for the deviation in the at least one geometric property of the object; and
(iv) estimate tool wear of a tool utilized to construct the object, wherein the method further includes dispositioning the tool based, at least in part, on the tool wear.

13. The method of claim 1, wherein the method further includes utilizing the global operation dataset during in-service repair of the object to at least one of:
(i) correlate a location of the operation data points with a location of a repair; and
(ii) predict the location of the repair based, at least in part, on the location of the operation data points.

14. The method of claim 1, wherein:
(i) the operation coordinate system is a 2-dimensional coordinate system; and
(ii) the global coordinate system for the object is a 3-dimensional coordinate system.

15. A scan system for analyzing an object, the scan system comprising:
a robot including a sensor configured to perform a plurality of operations at a plurality of corresponding operation locations on an object to generate a local operation dataset that includes a plurality of operation data points and a corresponding location, within an operation coordinate system, for each operation data point of the plurality of operation data points by:
(i) moving the robot relative to the object and to a plurality of distinct local locations within the operation coordinate system; and
(ii) collecting a corresponding test result at each distinct local location; and
a computing device programmed to map the plurality of operation data points from the operation coordinate system to a global coordinate system for the object, which differs from the operation coordinate system, to generate a global operation dataset that includes the plurality of operation data points and a corresponding global location, within the global coordinate system for the object, for each operation data point; wherein the computing device further is programmed to utilize the global operation dataset to determine a location of a defect within the object by comparing the defect to a predetermined defect tolerance, wherein the predetermined defect tolerance is a location-specific predetermined defect tolerance that varies with location within the operation coordinate system; and wherein the computing device further is programmed to direct at least one of:
  (i) scrapping the object when the defect is outside the predetermined defect tolerance;
  (ii) reworking the object when the defect is outside the predetermined defect tolerance; and
  (iii) approving the object for utilization when the defect is within the predetermined defect tolerance.

16. The scan system of claim 15, wherein the plurality of operations includes at least one of:
  (i) a non-destructive inspection of the object;
  (ii) a non-contact inspection of the object;
  (iii) an ultrasound inspection of the object;
  (iv) an infrared inspection of the object;
  (v) an optical inspection of the object;
  (vi) a dimensional inspection of the object; and
  (vii) a laser dimensional inspection of the object.

17. The scan system of claim 15, wherein the computing device is programmed to utilize a spatial relationship between the operation coordinate system and the global coordinate system for the object to map the plurality of operation data points from the operation coordinate system to the global coordinate system for the object.

18. The scan system of claim 17, wherein the computing device also is programed to determine the spatial relationship between the operation coordinate system and the global coordinate system for the object.

19. The scan system of claim 15, wherein the global coordinate system for the object describes a location of the plurality of operation data points relative to a reference structure of an aircraft.

20. The method of claim 1, wherein the global coordinate system for the object describes a location of the plurality of operation data points relative to a reference structure of the aircraft.

* * * * *